United States Patent Office 3,752,683
Patented Aug. 14, 1973

3,752,683
PROTECTION OF TURBINE CASINGS
Peter Frederick Hawthorne, Nechells, Birmingham, England, assignor to Foseco International Limited, Birmingham, England
No Drawing. Filed Oct. 1, 1970, Ser. No. 77,348
Claims priority, application Great Britain, Oct. 6, 1969, 49,044/69; July 2, 1970, 32,217/70
Int. Cl. C04b 35/66
U.S. Cl. 106—55
9 Claims

ABSTRACT OF THE DISCLOSURE

Shaped refractory articles, especially turbine casing liners, are formed of a refractory fibre/water soluble binder composition, the hardness, strength and density of which do not vary across the bulk composition.

This invention relates to refractory heat insulating materials, which, inter alia, are suitable for the protection of turbine engine casings, within which term is included the casing which constitutes the exhaust tube or tubes of such an engine.

Refractory heat insulating materials are used in industry for a wide variety of heat insulating purposes. In many cases, the properties of the material are not critical, but in extreme conditions, it is important to use materials which not only possess the required thermal properties but also possess them homogeneously. A disadvantage of very many types of refractory heat insulating material is variability of properties over relatively small distances. Thus, it is often found that the centre of a block of refractory heat insulating material is softer than the outside, or that the concentrations of the ingredients of the composition vary over the article made therefrom. This difficulty is described further in U.S. Pat. No. 3,077,413, note especially of column 3.

In use, therefore, failure of the refractory heat-insulating material tends to occur at one spot and then spread to the whole of the material. This is clearly undesirable.

According to the present invention there is provided a shaped article of refractory heat-insulating material which is formed of a dry composition comprising inorganic refractory fibre and a water soluble inorganic binding agent, and which is in the form of a composition of which the hardness, strength and density do not vary across the bulk material. Usually, though not necessarily, such a composition will be one in which the binding agent is homogeneously distributed.

Preferably, such a shaped article is made by forming a wet or damp mixture of the ingredients to the desired shape and then drying the so-formed shape by means of a drying method which does not cause migration of any of the components of the composition. Microwave drying or dielectric heating may be employed, the first of these being preferred.

The inorganic fibres used may be aluminosilicate, calcium silicate, asbestos, alumina, silica, zirconia or carbon fibres either singly or as a composite mixture of two or more. The binding agent used may be, for example, colloidal silica sol, colloidal alumina sol, sodium silicate, potassium silicate, ethyl silicate, or a metallic phosphate or borate. The refractory heat insulating composition may also include a proportion, e.g. up to 10% by weight of finely divided refractory material, e.g. alumina, silica, calcined rice husks, diatomite, kieselguhr, magnesia, silicon carbide, silicon nitride or fireclay, if desired.

One group of compositions of particular value are mixtures of colloidal silica sol and aluminosilicate fibre, the silica content of the dry composition being in the range 55–90% by weight. These compositions may be made as noted above, though if the silica content of the dry material at first produced is too low, then the material may be dipped in further silica sol and dried further (by a method such as microwave drying which does not cause the silica sol to migrate) to give a material of desired silica content.

Specific compositions of value may be made by drying shaped mixtures of aqueous colloidal silica sol and aluminosilicate fibres. The dried shape may have a composition of for example (by weight), fibre 34%, silica 66%. Calcined rice husks may replace some of the fibre in such material, for example in a composition consisting of silica 66%, calcined rice husks up to 10% and the residue being the said inorganic fibre.

The present invention also includes within its scope treated refractory heat insulating materials or composite refractory heat insulating materials which have as basis a heat insulating refractory material according to this invention and as defined above. Thus, composite insulating materials may be formed of two layers each of material according to the invention but of differing densities. The lower density layer can even be honeycombed if desired. Further, composite materials may be made by facing or backing articles according to the invention with a heat reflective layer such as aluminium foil.

If desired, the surface of the article may be faced with a refractory dressing, for example, an aqueous suspension of alumina, zirconia, zirconium silicate, magnesia, silica or the like, or a flame sprayed refractory coating. The refractory dressing may comprise a backing agent such as colloidal silica or alumina sol, sodium silicate, potassium silicate, ethyl silicate or a metallic phosphate or borate.

As noted above, the refractory heat insulating materials of this invention are of particular value in the protection of turbine engine casings. These are, in use of the engine, subjected to severe conditions: for example, the temperature of gases inside the casing may reach between 900° C.–1400° C. and the pressure changes inside the casing (because the load on or power output of the engine changes) may range from atmospheric up to ten atmospheres or more, the pressure outside the casing remaining atmospheric. As well as the mechanical forces generated by these changes, the casing is subjected to vibrational stresses over a wide range of frequencies during running.

Turbine casings for road vehicles are usually made of spheroidal graphite cast iron, and this material does not stand up well to the condition of service. At 250° C. and above, progressive modification of the internal structure of the metal takes place, and the desirable mechanical properties are lost. Eventually, the turbine casing must be replaced with a new casing. Such replacement is not only uneconomic, but very inconvenient since the majority of other components of a turbine engine have comparatively much longer lives.

By affixing in a turbine casing a lining of material according to the present invention, preferably 12–75 mm. thick and most preferably 25–40 mm. thick, the protection of such casings may be achieved and their life considerably extended, for example to 3 years (300,000 miles) or more. During such life, the casing requires little or no maintenance, the layer of heat insulating refractory material according to the invention giving rise to no maintenance problems.

Further, by similar use of materials according to the present invention the life of the turbine casing and exhaust system of an aero jet engine may be materially increased. This is of particular importance as it enables cheaper alloys than the presently employed "Nimonic" or "Inconel" alloys, to be used for the casing and exhaust systems and under optimum conditions renders it unnecessary to provide any other protective casing to prevent dissipation of heat to other parts of the aircraft structure.

In the lining of the casing of aero jet engines compositions of the aforesaid type are preferred in which a proportion of the fibre (amounting to up to 10% by weight of the whole composition) is replaced by calcined rice husks. If a two layer material as described above is used for lining a turbine or aero engine casing, the lower density layer is preferably adjacent to the casing itself and the higher density layer is exposed to the high temperature gases inside the casing.

The refractory heat insulating materials of this invention, when used for lining turbine, aero engine or exhaust casings, may be secured in place by any convenient method such as adhesion, bolting or riveting, or by two or more such methods. Alternatively the compositions may be applied in slurry or paste form to the turbine or like casing and the whole then dried to give the desired product.

The following examples will serve to illustrate the invention:

EXAMPLE 1

A preformed web of colloidal silica sol bonded aluminum silicate fibre, of thickness 25 mm., was adhered with a sodium silicate based adhesive to the inside of a turbine casing, part of the engine of a gas turbine driven truck, and riveted in place at the edges thereof.

The casing was installed in the engine which was then used in a gas turbine truck for 300,000 miles. The engine was dismantled and the lining inspected. Little erosion had taken place and the casing itself was metallurgically unchanged.

In contrast, a similar engine casing without the lining or other protection failed (cracked) after only 15,000 miles use.

EXAMPLE 2

A web of 25 mm. thickness was formed of a composition comprising silica sol, calcined rice husks and aluminium silicate fibre, which was dried by microwave drying to give a composition as follows:

| | Percent by weight |
|---|---|
| Silica | 66 |
| Aluminium silicate fibre | 27 |
| Calcined rice husks | 7 |

This web was adhered to the inside of the exhaust of an aero jet engine and rivetted in place at its edges.

The jet engine was used for 5000 flying hours and then dismantled and the exhaust inspected. It was found that very little erosion had taken place and the casing itself was metallurgically substantially unchanged.

EXAMPLE 3

A simple cycle low pressure ratio 370 HP regenerative twin shaft gas turbine engine was fitted with an exhaust duct 30 cm. diameter and 30 cm. long, of 6 mm. thick spheroidal graphite cast iron. This duct was lined with 25 mm. thick webs of materials having the composition indicated in Example 2 but of two different densities, 0.52 gm./cc. and 0.35 gm./cc.

The engine was test run in the open air at a gassifier speed of 19,000 r.p.m., (idling) and a power turbine speed of 3250 r.p.m., to give a gas stream of temperature 900° C. and velocity 305 m./sec.

Insulator performance was measured by measuring the outside face temperature of the iron casting by means of six thermocouples (three at the end adjacent the engine, and three at the other end) once steady-state conditions had been reached.

Mean outside face temperature for the material of density 0.52 gm./cc. was 175° C., while for material of density 0.35 gm./cc. it was 129° C.

I claim as my invention:

1. A shaped article of refractory heat-insulating material comprising a dry composition consisting essentially of an inorganic refractory fibre and a water soluble inorganic binding agent, said shaped article having said refractory fibre and binding agent present in a homogeneous relationship and said shaped article further having uniform hardness, strength and density across the shaped article.

2. A shaped article according to claim 1 wherein the binding agent is homogeneously distributed.

3. A shaped article according to claim 1 wherein the inorganic fibre is at least one fibre selected from the class consisting of aluminosilicate fibre, calcium silicate fibre, asbestos, alumina, silica, zirconia and carbon fibres.

4. A shaped article according to claim 1 wherein the binding agent is selected from the class consisting of colloidal silica sol, colloidal alumina sol, sodium silicate, potassium silicate, ethyl silicate and metallic phosphates and borates.

5. A shaped article according to claim 1 which includes up to 10% by weight of a finely divided refractory material.

6. A shaped article according to claim 5 wherein the refractory material is selected from the class consisting of alumina, silica, diatomite, kieselguhr, magnesia, silicon carbide, silicon nitride and fireclay.

7. A shaped article according to claim 1 which consists substantially of colloidal silica sol and aluminosilicate fibre, the silica content of the dry composition being 55–90% by weight.

8. A shaped article according to claim 7 which includes up to 10% by weight of calcined rice husks.

9. A shaped article according to claim 1 which is in the form of a turbine casing liner.

References Cited
UNITED STATES PATENTS

| | | | |
|---|---|---|---|
| 2,808,339 | 10/1957 | Bruno et al. | 106—69 |
| 2,811,457 | 10/1957 | Speil et al. | 106—69 |
| 3,024,125 | 3/1962 | Lee | 106—69 |
| 3,077,413 | 2/1963 | Campbell | 106—69 |
| 3,100,734 | 8/1963 | Rex et al. | 106—65 |
| 3,231,401 | 1/1966 | Price et al. | 106—69 |

JAMES E. POER, Primary Examiner

U.S. Cl. X.R.

106—56, 57, 65, 69, 84, 85